A. E. BLACKBURN.
DEVICE FOR PREVENTING REARWARD TILTING OF TRACTORS.
APPLICATION FILED DEC. 4, 1920.

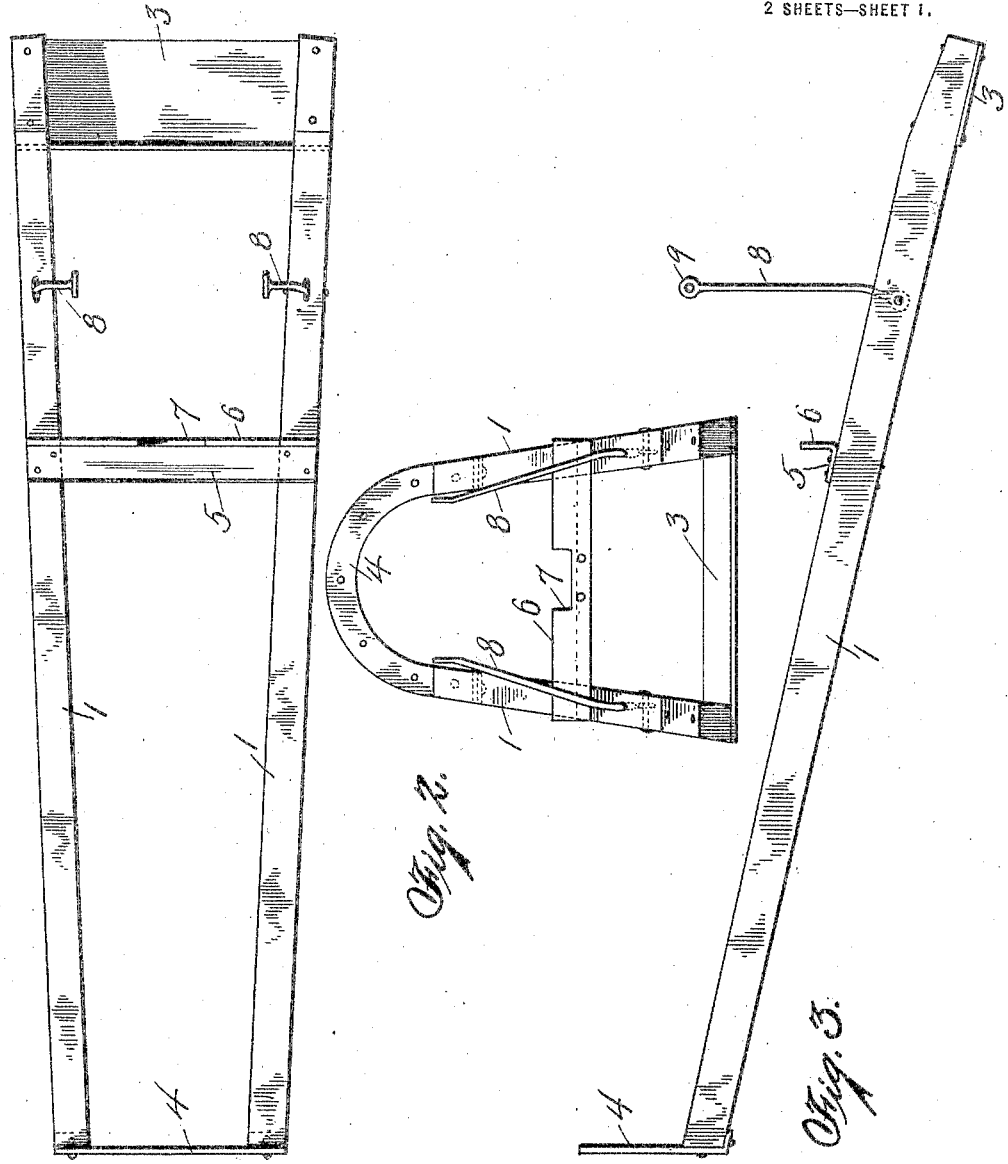

1,372,396.

Patented Mar. 22, 1921.
2 SHEETS—SHEET 2.

A. E. Blackburne,
INVENTOR.

BY E. T. & J. H. Brandenburg
ATTORNEYS

UNITED STATES PATENT OFFICE.

ALBERT E. BLACKBURN, OF LAUREL, FLORIDA.

DEVICE FOR PREVENTING REARWARD TILTING OF TRACTORS.

1,372,396.  Specification of Letters Patent.  Patented Mar. 22, 1921.

Application filed December 4, 1920. Serial No. 428,274.

*To all whom it may concern:*

Be it known that I, ALBERT E. BLACKBURN, a citizen of the United States, residing at Laurel, in the county of Manatee and State of Florida, have invented certain new and useful Improvements in Devices for Preventing Rearward Tilting of Tractors, of which the following is a specification.

It is well known that tractors, particularly the type known as the Fordson, are likely, under certain conditions, to overturn backward.

The object of this invention is to provide a simple and efficient device in the nature of an attachment to a tractor, particularly the Fordson tractor, for preventing the overturning backward thereof.

The invention in its preferred form is clearly illustrated in the accompanying drawings, in which like reference characters designate corresponding parts throughout the several views. Briefly described:

Figure 1 is a view, in top plan, of the device of my invention;

Fig. 2 is a view, in end elevation thereof, looking at the right-hand end of Fig. 1;

Fig. 3 is a view in side elevation thereof;

Referring now in detail to the drawings:

1, 1 designate two spaced beams, which are preferably disposed somewhat out of parallelism, being farther apart at one end than at the other, as clearly shown in Fig. 1.

Connecting the beams at the ends thereof, which are farther apart, is a plate 3, preferably of steel, which affords an extended bearing surface for contact with the ground when the tractor starts to tilt backward.

Figure 4:
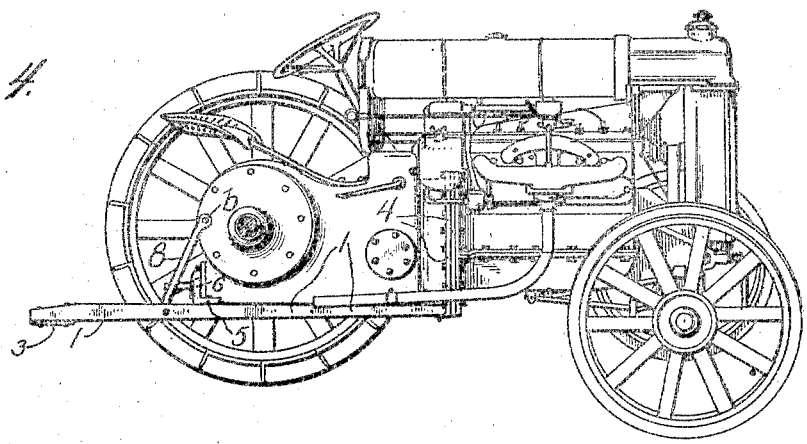
Fig. 4 is a view, in side elevation, of a Fordson tractor, showing the application of my attachment thereto.
Figure 5:
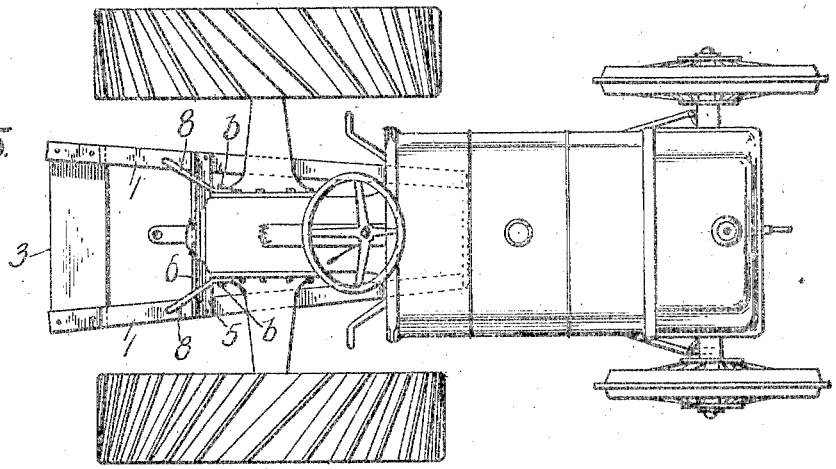
Fig. 5 is a top plan view of said tractor, with the attachment in operative position thereon.
Figure 6:
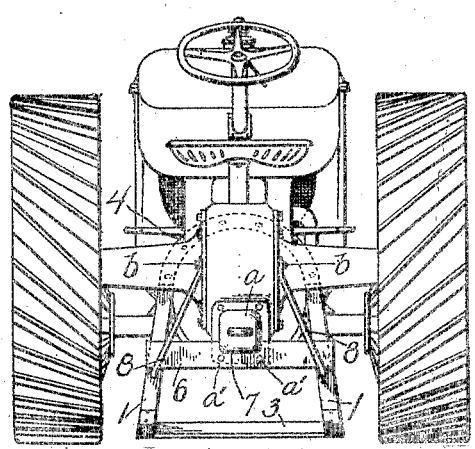
Fig. 6 is a view, in rear elevation, of said tractor, with the attachment in operative position thereon.

Connecting said beams, at the opposite ends thereof, is a curved arch 4, constituting a strap, preferably of iron, adapted to be disposed over the tractor body transversely thereof, as clearly shown in Figs. 4 and 6, at a point which is ahead of the transmission housing. The strap 4 may be suitably detachably secured to the transmission housing, as by means of bolts and nuts.

The beams 1, 1, intermediate the ends thereof, are connected by an angle bar 5, the upright flange 6 of which is provided, intermediate its ends, with a cut-away portion 7, in which is adapted to seat the draw-bar cap $a$ of the tractor, as shown most clearly in Fig. 6. This angle bar 5 is preferably secured to the tractor by means of the two bolts $a'$, $a'$, which is under the draw-bar, as seen in Fig. 6.

Preferably carried by each of the beams 1, 1 is a suspension rod beam, provided at one end with an eye 9 through which is adapted to pass one of the bolts $b$ on the rear axle housing B of the tractor. By means of the rods 8, 8, the beams 1, 1 are suspended toward the rear ends from the rear axle housing.

It will now be understood, from the construction described, that the attachment is firmly and rigidly, yet detachably secured to the tractor, and that as the tractor starts to tilt backward, the plate 3 will be brought into contact with the ground, thus stopping further rearward tilting movement of the tractor. It will also be noticed, from the construction described, that the attachment is simple, practical and inexpensive to manufacture, that it is readily installed on and removed from the tractor, and that it is most efficient in operation for the purpose intended.

What I claim to be new and desire to secure by Letters Patent is:

1. An attachment to tractors to prevent rearward tilting thereof, comprising two beams, a curved strap connecting the latter, toward one end thereof, and adapted to be passed transversely over the tractor body, a member connecting the beams intermediate the ends thereof, and having, intermediate its ends, a cut-away portion in which is adapted to seat the draw-bar cap of a Fordson tractor, and suspension rods pivotally connected by said beams and adapted to be secured to the tractor.

2. An attachment to tractors to prevent rearward tilting thereof, comprising two beams, a curved strap connecting the latter, toward one end thereof, and adapted to be passed transversely over the tractor body, a member connecting the beams intermediate the ends thereof, and having, intermediate its ends, a cut-away portion in which is adapted to seat the draw-bar cap of a Fordson tractor, and suspension rods pivotally connected by said beams and adapted to be secured to the tractor.

In testimony whereof I affix my signature.

ALBERT E. BLACKBURN.